United States Patent

Schermutzki et al.

[11] Patent Number: 5,149,445
[45] Date of Patent: Sep. 22, 1992

[54] PROCESS AND APPARATUS FOR THE PURIFICATION OF SUBSTANCES

[75] Inventors: Konrad Schermutzki, Remseck; Herbert Würmseher, Meitingen, both of Fed. Rep. of Germany

[73] Assignee: Santrade Ltd., Lucerne, Switzerland

[21] Appl. No.: 804,597

[22] Filed: Dec. 10, 1991

[30] Foreign Application Priority Data

Dec. 22, 1990 [DE] Fed. Rep. of Germany ....... 4041669

[51] Int. Cl.$^5$ .............................................. B01D 43/00
[52] U.S. Cl. .................................... 210/773; 210/774; 210/803; 210/532.1
[58] Field of Search ............ 210/773, 774, 803, 532.1; 266/208, 8; 75/419

[56] References Cited

U.S. PATENT DOCUMENTS 3,550,925 12/1970 Evans et al. ................ 210/773 X

Primary Examiner—Frank Spear
Attorney, Agent, or Firm—Burns, Doane, Swecker & Mathis

[57] ABSTRACT

A substance is provided in molten form and then converted into crystallized pellets. The pellets are conveyed into a vessel having an open lower end, whereby the pellets continuously advance downwardly. As the pellets advance, they are subjected to a hot gas flow which causes outer contaminated surfaces of the pellets to melt and drip off. The remaining pellets travel out through the opening in a direction transversely of the direction of the dripping. In this manner, the substance is purified.

16 Claims, 1 Drawing Sheet

PROCESS AND APPARATUS FOR THE PURIFICATION OF SUBSTANCES

BACKGROUND OF THE INVENTION

The invention concerns a process and apparatus for the purification of chemical substances, which initially are melted and crystallized by the removal of heat, whereupon they are exposed to a sweating process in which the contaminated crystallized surfaces are melted and the molten part removed prior to the recovery of the remaining purified substance.

It is known (e.g., see Chemie-Ingenieur-Technik 57 (1985), pg. 97) to carry out the purification of chemical substances, for example of acetic acid, by melt crystallization in tubular type crystallizers. This process is based upon the fact that crystals are chemically purer than the initial melt. Impurities are pressured against grain boundaries in the course of crystal formation or remain in the residual melt.

The known processes operate discontinuously. The melt crystallizes in a first stage on cooled walls. Prior to the remelting of the now pure crystalline layer, a so-called sweating is carried out. By raising the temperature just above the melting point, the crystalline surface, still contaminated, is melted. An outer portion of the product sweats-off and runs down so as to be collected and removed in the form of a melt. By further raising the temperature, the purified crystalline layer itself is melted, thereby obtaining the final substance.

It is an object of the present invention to provide a process and apparatus whereby a purification process may be carried out continuously.

SUMMARY OF THE INVENTION

To attain this object, the molten substance is initially formed into drops and solidified into pellets. The pellets are conveyed while simultaneously being exposed to a sweating process in a hot gas flow. The pellet surfaces are melted off and drip down, and the remaining pellets are removed, preferably in a direction transversely to the direction of dripping.

In such a process, constant conditions may be maintained in a highly accurate fashion Purification may thus be carried out with a high yield and very economically even with a high product flow rate. Advantageously, the hot gas flow, which is at a temperature higher than the melting temperature of the pellets, is conducted upwardly against the underside of an inclined permeable support conveyor for the pellets. The flow of hot gas is capable not only of heating the pellets to the necessary temperature, but also of lifting them from the support, thereby facilitating the removal of the pellets.

The conveyor preferably comprises a vessel to receive the pellets, with the bottom of the vessel being permeable and aligned with a discharge opening provided in a lateral wall of the vessel, and wherein under the vessel bottom an upward flow conduit of the hot gas is established. The vessel bottom is arranged so that the pellets resting upon it may be transported in the direction of the discharge opening.

It is advantageous to provide the vessel with vertical lateral walls and to form the vessel bottom in the form of a perforated support extending obliquely relative to the lateral walls. The pellets gravitate under their own weight to the discharge opening. The load relieving action of the hot gas flow directed against their weight is favorably noticeable in the conveying processing by lifting the pellets to facilitate their downward movement along the inclined vessel bottom.

The walls of the vessel may extend advantageously to a level below the perforated support and form an inlet opening for the hot gas flow at the lower end of the vessel. The walls may further be provided in the area above the vessel bottom with a heater, whereby the mass of pellets in the vessel may be heated. The discharge opening may be equipped with a gate making it possible to obtain a controlled flow of the pellets.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
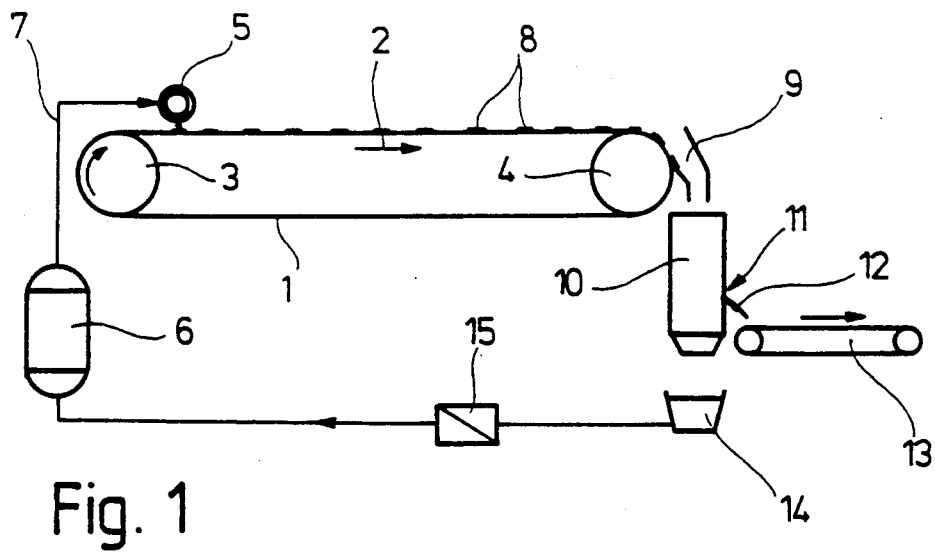
FIG. 1 is a schematic view of an apparatus to carry out the process according to the invention.

FIG. 1 schematically shows an apparatus for carrying out the process according to the invention for the purification of chemical substances. An endless cooling belt 1, revolving in the direction of the arrow 2, is provided. Within an area bordered by the path of the revolution of the belt, a cooling device (not shown) is located, which may comprise for example spray nozzles spraying a cooling liquid from below against the upper flight of the cooling belt 1. Upstream and downstream reversing rolls 3 and 4 support the endless cooling belt 1. A feeder device 5 situated adjacent the upstream roll 3 feeds melt of a chemical substance suitable for crystallization, which for example is prepared in a vessel 6 and conducted through a line 7 to the feeder device 5. The feeder device 5 may comprise a known drop forming device, operating for example with two reciprocating needles or designed in the manner of a known rotary drop former, such as described for example in DE 28 53 054. Rotary drop formers of this latter type comprise outer and inner coaxial cylinders. The outer cylinder being rotatable, and the inner cylinder being stationary. The outer cylinder is perforated over its entire circumference, and those perforations periodically become aligned with a series of openings (or with a slit or a nozzle lip) formed in the inner cylinder. The melt contained inside the inner cylinder drips under pressure through the aligned openings onto the cooling belt 1 to form on the belt a row of drops 8 distributed adjacent to each other across the width of the belt.

Figure 2:
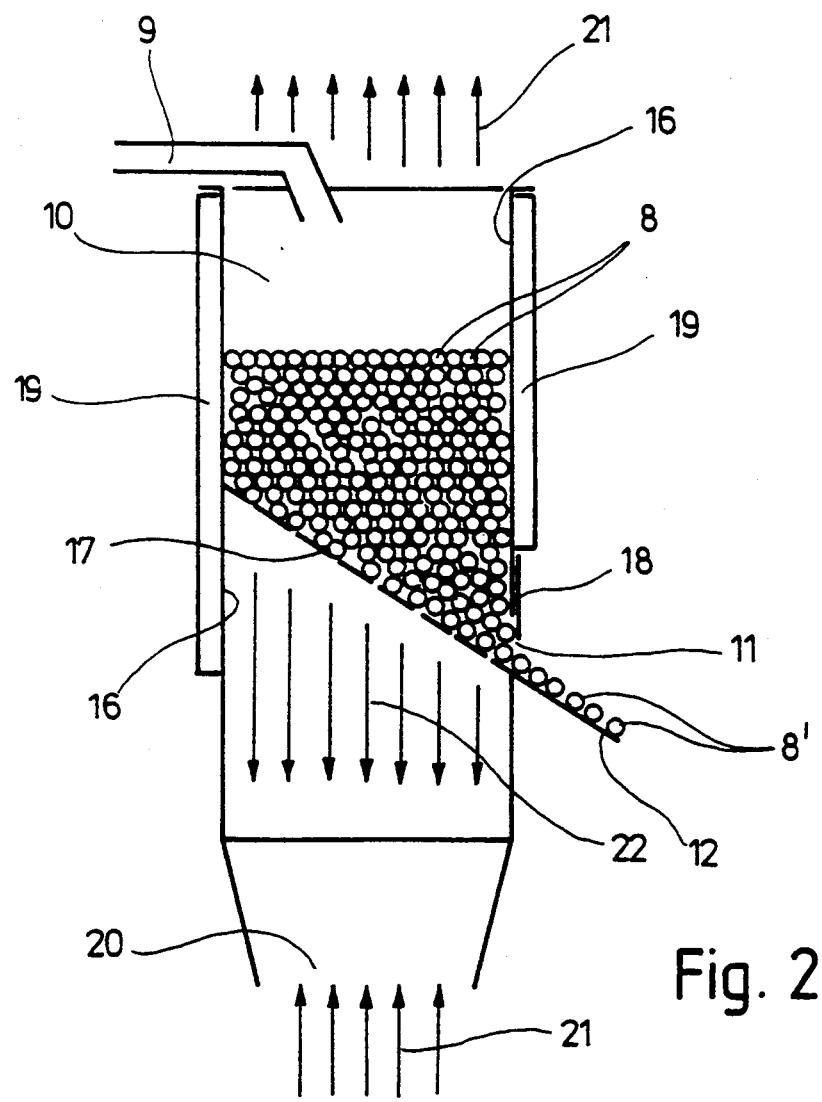
FIG. 2 is a schematic vertical sectional view of the vessel for carry-out the sweating process of FIG. 1.

The drops, thus formed continuously on the cooling belt 1 crystallize into solid pellets, which at the downstream end of the cooling belt 1 slide off the belt and pass into a feeder channel 9 located above a conveying vessel 10. In this vessel 10, as explained in more detail relative to FIG. 2, the pellets are heated and their outer surfaces are "sweated" off, whereupon the remaining purified crystalline pellets continuously leave the vessel 10 through a discharge opening 11 and a conveyor chute 12, and are transported for further processing, for example on a conveyor belt 13.

The relatively impure part of the substance sweated or melted off the pellets 8 drips from the vessel 10 down into a collecting device 14 and may be recycled from there, in a manner not shown, through a heat exchanger 15 for being remelted prior to being fed back into the melt vessel 6.

The vessel 10, which is an important aspect of the core of the invention, comprises a vertical side 16 which may be cylindrical (or rectangular), corresponding essentially to the width of the cooling belt 19. Disposed obliquely to the vertical side 16 within the vessel there is disposed a perforated bottom 17 which is aligned with a discharge opening 11 in the side. The discharge opening 11 is combined with a lock or gate structure 18, which assures that only a controlled quantity of the pellets 8 passes out onto the chute 12. The vessel 10 has a heating section 19 surrounding its upper periphery to maintain the pellets 18 arriving inside the vessel at a predetermined uniform temperature.

The part of the side 16 projecting downwardly past the bottom 17 forms an inlet opening 20 for conducting a hot gas flow 21, which is introduced into the vessel from below. The gas flow exits from the top of the vessel. The hot gas flow 21 is at a temperature sufficient to melt the surface of the pellets 8 in the region of the bottom 17 to cause them to "sweat". The force of the flow of hot gas acts on the pellets to prevent the softened surfaces of the pellets from adhering to each other in the region of the bottom 17, so that only a certain contaminated surface layer is melted off, and the molten volumes drip off in the direction of the arrows 22 downward from the inlet opening 20. The drippings are recovered in the collector device 14 in keeping with FIG. 1. The lowermost pellets are lifted from the support 17 by the hot gas flow to facilitate their travel to the outlet 11. The pellets 8' exiting through the discharge opening 14 are free of their contaminated surface (which has been melted off) and consequently represent the chemical substance originally contained in the vessel 6 in a solid, but significantly purer form. The pellets may therefore be processed further. It is, however, also possible to subject them once or several times more to the same purification process if so desired.

It will be appreciated that the present invention enables the chemical purification process to be carried out continuously.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A process for the purification of a substance, comprising the steps of:
   providing the substance in molten form,
   forming the molten substance into drops which are solidified into crystalline pellets,
   conveying the pellets while subjecting the pellets to a flow of hot gas causing outer surfaces of the pellets to melt and drip off, and recovering the dripped-off melt and said pellets separately.

2. A process according to claim 1, wherein said drops are continuously deposited onto a cooling conveyor, said conveying step comprising conveying said drops on said cooling conveyor as said drops solidify into pellets, transferring said pellets into a conveying vessel in which said pellets continuously descend to a bottom outlet opening of said vessel while said hot gas is flowed through said vessel.

3. A process according to claim 2, wherein said forming step comprises continuously discharging drops of said substance from a rotary drop former.

4. A process according to claim 2, wherein said recovering step comprises allowing the dripped-off melt to gravitate downwardly through a perforated bottom of said vessel, and removing said pellets through said vessel outlet in a direction transversely to the direction of flow of said dripped-off melt.

5. A process according to claim 1, wherein said hot gas is flowed while at a temperature higher than a melting temperature of said pellets and is directed upwardly against a perforated floor of said vessel upon which said pellets are being conveyed.

6. A process according to claim 5, wherein said pellets are accumulated in a mass upon said floor and gradually gravitate downwardly toward said floor as the lowermost pellets on said floor are discharged through an outlet of said vessel located in alignment with said floor.

7. A process according to claim 6, wherein said outer surfaces of said pellets are caused to melt only once said pellets have reached said floor.

8. A process for the purification of a chemical substance, comprising the steps of:
   providing the substance in molten form,
   forming the substance into drops which are solidified into crystalline pellets,
   subjecting to the pellets to hot gas to cause outer surfaces of the pellets to melt and drip off, and
   removing the remaining pellets in a direction transversely to the direction of dripping.

9. Apparatus for the purification of a substance, comprising:
   forming means for forming the substance into crystalline pellets,
   conveying means for conveying the pellets while subjecting the pellets to a flow of hot gas causing outer surfaces of the pellets to melt and drip off, and
   recovering means for recovering the dripped-off melt and pellets separately.

10. Apparatus according to claim 9, wherein said conveying means includes a vessel to which the pellets are delivered, said vessel having a permeable floor, means for conducting said hot gas flow upwardly through said permeable floor, and an outlet disposed adjacent said floor through which said pellets are discharged.

11. Apparatus according to claim 10, wherein said recovery means includes means disposed below said permeable floor for recovering the dripped-off melt, said outlet disposed in an upright side of said vessel.

12. Apparatus according to claim 10, wherein said floor is inclined toward said outlet.

13. Apparatus according to claim 10, wherein said vessel includes an upright side which extends below said floor to form a conduit for the hot gas flow.

14. Apparatus according to claim 10 including means for heating a portion of said vessel above said floor.

15. Apparatus according to claim 10, wherein said outlet includes a movable gate for adjusting the size of said outlet.

16. Apparatus for the purification of a substance, comprising:

forming means for forming the substance into crystalline pellets, a vessel having an opening adjacent a lower end thereof, and a floor leading to said opening, means for introducing the pellets into said vessel such that said pellets accumulate vertically therein and progressively advance downwardly toward said floor and out of said opening, and means for introducing a flow of hot gas upwardly through said vessel to cause outer surfaces of the pellets to melt and drip off as the pellets advance downwardly.

* * * * *